3,395,215
PRESSURIZED LOTION COMPOSITION

Warren Robert Schubert, Franklin Township, Somerset County, N.J., assignor to Colgate-Palmolive Company, New York, N.Y., a corporation of Delaware
No Drawing. Filed Oct. 15, 1964, Ser. No. 404,162
14 Claims. (Cl. 424—47)

This invention relates to a dermal lotion, and, more particularly, to a foamable cosmetic composition for use as a hand lotion.

The composition of the invention contains, as an important ingredient, from about 0.1 to 0.5 percent by weight, preferably about 0.2 percent, of a polymer in the nature of synthetic, mucilaginous substances, which preferably contain carboxylic salt groups. It is preferred to employ cross-linked polymers which are produced by the polymerization or intermolecular reaction of two or more different monomers containing polyfunctional groups. The term polymer includes therefore copolymers.

Suitable examples of such polymers are disclosed in British patent specification No. 799,951, published Aug. 13, 1958, and U.S. Patent No. 2,798,053, granted July 2, 1957, the disclosures of which are incorporated herein by reference. The polymers disclosed therein are compositions comprising a cross-linked interpolymer of (a) a mono-olefinic monomeric material comprising at least 25% by weight of a monomeric olefinically-unsaturated carboxylic acid containing at least one activated carbon to carbon double bond such as acrylic acid, and (b) from about .01 to about 10% by weight of a polyunsaturated cross-linking agent containing a plurality of polymerizable vinyl or crotyl groups such as a polyalkenyl polyether of a polyhydric alcohol. More particularly, the preferred interpolymers are derived from a mixture of acrylic acid and a polyether of sucrose in which the hydroxyl groups which are modified are etherified with at least two allyl groups per sucrose molecule. A specific material thereof contains about 97.5 to 99.8% and preferably 99% by weight of acrylic acid and about 2.5 to 0.2% by weight of a monomeric polyether of sucrose in which the hydroxyls are etherified with at least two, and preferably about five to about six allyl groups per sucrose molecule.

The carboxylic acid polymer should be at least partially neutralized in the polar solvent to form a suitable base in accordance with the present invention. Such carboxyvinyl polymers are available commercially in the free acid form and neutralized as required to develop the desired flow characteristics. A wide variety of bases can be used to neutralize the carboxylic acid groups of the polymer to provide satisfactory final products, usually to the extent of at least about 10% neutralization. Among the preferred neutralizing agents are ammonium hydroxide, alkylolamines such as triethanolamine and monoethanolamine; and alkali metal bases such as sodium and potassium hydroxide and carbonate. Other neutralizing agents or materials are amines such as triethylamine, triamylamine and the like. The selection of a particular salt will be influenced in part by the polar solvent medium desired since some neutralizing agents form polymeric salts which are soluble in some systems, but insoluble in others. Thus the ammonium, alkali metal, certain alkylolamine and lower aliphatic amine salts are soluble in polar mediums such as water, and various aliphatic alcohols such as glycerine, ethylene glycol and propylene glycol. It is possible to use solvents in part in which the polymeric salts are not soluble provided a sufficient quantity of a polar co-solvent is present in which the polymer is soluble.

The dermal lotion also contains, as an important ingredient, from about 2 to 7 percent, preferably about 4 percent, by weight of a fatty emollient which advantageously comprises at least one higher fatty alcohol having from 14 to 18 carbon atoms. Thus, there may be used such alcohols as myristyl alcohol, palmityl alcohol, oleyl alcohol, stearyl alcohol and cetyl alcohol. Preferably the emollient is an alcohol containing 16 to 18 carbon atoms. Among the most useful alcohols are cetyl and oleyl alcohols, and, advantageously, the emollient is a mixture of cetyl and oleyl alcohols in the ratio of between about 1:1 to 4:1 and preferably between about 1.5:1 and 3:1. Desirably, the emollient is used in combination with up to about 4% and preferably about 0.5% lanolin or the liquid fraction thereof to confer desired feel and soothing characteristics to the composition.

The composition is formulated as an oil-in-water emulsion. In order to form a stable emulsion capable of being used as a dermal lotion, it is necessary to use about 0.5 to 3.0% preferably about 0.75% by weight of an emulsifier of the type that forms an oil-in-water emulsion. An emulsifier system suitable for use with the composition of this invention is an alcoholysis product of lanolin and a polyoxyalkylene ether of a hexitol in admixture with an alkylene oxide condensate of tertiary amine. The alcoholysis product is preferably an interreaction product of lanolin, a polyoxyalkylene ether, and oleic acid, of the type described in U.S. Patent No. 2,608,563, granted Aug. 26, 1952, and sold under the trademark "Atlas G–1471" wherein the polyoxyalkylene ether is a mixture of compounds resulting from the addition of a low molecular weight alkylene oxide to a hexitol solution. Preferably the alkylene oxide used is ethylene oxide although other low molecular weight compounds such as propylene oxide can be used. The hexitol solution is advantageously an aqueous solution of sorbitol containing up to about 20 percent water, and the polyoxyalkylene ether is preferably a mixture of compounds made by the addition of from about 3 to 10 parts by weight of ethylene oxide to one part by weight of the aqueous sorbitol solution. The respective weights of the polyoxyethylene ether and lanolin should be in the ratio of from about 0.75 to about 2.0 and the proportion of oleic acid should be about stoichiometrically equivalent to the combined hydroxyl contents of the polyoxyethylene ether and the lanolin. Preferably, the polyoxyethylene ether is that formed by the addition of 7.25 parts by weight of ethylene oxide to 1 part of an 85% aqueous sorbitol solution.

The second constituent of the preferred emulsifying system is a tertiary amine having one fatty alkyl group with from 12 to 18 carbon atoms and two polyoxyethylene groups attached to the nitrogen. The tertiary amine corresponds to the formula:

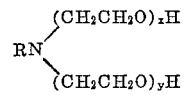

wherein R is a fatty alkyl group having from 10 to 18 carbon atoms such as can be obtained from coconut oil fatty acids, tallow fatty acids, stearic acid, and the like. It is preferred that the amine be the ethoxylation product of about 15 moles of ethylene oxide with one mole of cocoamine. The symbols $x$ and $y$ represent integers, the sum of which averages between about 10 and 40, preferably about 15. The constituents of the emulsifying system will advantageously be in the ratio of about one part of said alcoholysis product to about two parts of said condensate, although this ratio of the alcoholysis product to condensate may be varied from about 2:1 to 1:5.

The composition should also contain from about 0.1 to 5.0 percent and preferably about 1.0 to 2.0 percent by weight of isopropyl myristate as an additional emollient. Surprisingly, it has been found that the time required for forming the composition can be minimized by addition of isopropyl myristate at the proper time. It has been found that by the simple expedient of initially forming a slurry of isopropyl myristate and the interpolymer defined more fully hereinabove, the time required for commercial production of this composition can be reduced by about two-thirds, thereby enabling the product to be made in as little as one-half hour, as opposed to a time requirement without this expedient of about 1½ hours.

It is important to dissolve this slurry in water, to form an emulsion having a very low viscosity, and, subsequently, to add a neutralizing agent to raise the pH of the interpolymer thereby forming a liquid having the desired viscosity which, as advantageously measured by a No. 5 Raymond flowmeter at 75° F., is between 15 and 90 seconds, preferably between 30 and 60 seconds. The test using a No. 5 Raymond flowmeter is performed by placing a sample at a specified temperature in a glass tube that has an inside diameter of one inch. At the bottom of this tube there is concentrically placed a stainless steel tube having an inside diameter of 0.252±0.001 inch. The glass tube is marked so that the tube will read empty when there are two inches of material left in the glass tube above the upper end of the stainless steel tube. The apparatus is positioned so that both tubes are vertical. The tubes are filled and the material is allowed to flow freely from the bottom thereof. The time required for 50 milliliters of material to flow from a 50 milliliter mark to the empty mark is then measured in seconds. This method enables strict control of the physical properties viscosity thereby making it possible to produce a product having a small and substantially uniform bubble size wherein the foam is capable of breaking down in a short period of time.

There may be also added to the lotion from about 0.25 to 2.0% by weight and preferably about 1.0% by weight of an acyl lactylic acid of the general formula

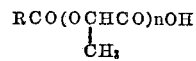

in which RCO is an acyl radical of a fatty acid containing from 12 to 24 carbon atoms and $n$ is a symbol representing an integer between 1 and 8.5 preferably between 1 and 3. The integer represents the average number of acyl groups present in the acyl lactylic acid product. The alkali metal salts of the above described acid may also be used. Compounds of this type are described in detail in U.S. Patent No. 2,789,992, issued Apr. 23, 1957. It is preferred that the acyl lactylic acid be stearyl-2-lactylic acid. Use of the acyl lactylic acid improves the foam structure of the final product whereby smaller and uniform bubbles and adequate control of the foam stability can be obtained. The acyl lactylic acid may advantageously be added in conjunction with small amounts of a mixture of mono- and di-glycerides of stearic acid. The stearic acid glycerides should advantageously be used in amounts of about 0.1 to 2.0 parts by weight.

It may be desirable to add small quantities on the order of about 3.0 to 6.0 percent and preferably about 4.0% of a dilute, i.e. about 2%, aqueous solution of a polyvinylmethyl ether-maleic anhydride copolymer in which the maleic acid represents from 0.01 to 1.0% by weight in order to improve the feel, slip, and rub-in properties of the dermal lotion of this invention. In addition, for the same purpose, the lotion may also contain a small amount of mineral oil. For example, amounts of mineral oil up to about 2% by weight may be added.

The combination of components of this invention produces a composition which is stable, thereby giving the product a long shelf life and enabling the lotion to remain usable until it is completely consumed. The lotion is more emollient, has a pleasant feel upon application, is more moist, and is capable of being readily distributed over, and absorbed into the skin. The composition will form a foam having a small and substantially uniform bubble size. Furthermore, the foam is capable of breaking down within a short span of time, preferably less than about 30 seconds, so that the lotion does not resist absorption into the skin. The lotion of this invention thus is a stable composition which forms an unstable foam having a small and substantially uniform bubble size, is pleasant to the feel, and is capable of absorption in relatively short time periods.

Various compatible adjuvants may be added to the invented lotions for the special effects or properties. Their addition may be made at any suitable stage of the processing and the manufacturing procedure may be adjusted, if desirable, to better effect admixing of adjuvants and to maintain stability of the lotion. As illustrative of such additives may be mentioned bactericides, e.g. up to about 1% hexachlorophene preservatives, to combat mold and bacterial growth, e.g. methyl and propyl para-hydroxybenzoate, or phenyl mercuric acetate, skin restoratives, e.g. up to about 1% preferably about 0.1% allantoin; skin rejuvenators, e.g. steroids; deodorants; thickening agents, e.g. hydroxy alkyl cellulose; humectants, e.g. sorbitol; and opacifiers, e.g. behenic acid.

The constituents of the dermal lotion as set forth above are combined in a manner described herein, and are placed in a pressure resistant container having a normally closed valve-controlled outlet using a suitable valve assembly, and then nitrous oxide, as propellant, is added thereto. It is important in the formulation of the lotion of this invention that the propellant be nitrous oxide because the particular combination of ingredients with nitrous oxide as propellant provides a product having desirable properties as set forth above, and, in addition, produces a lotion that need not be shaken before use.

EXAMPLE I

A typical foamable dermal lotion preparation has the following ingredients:

| Part One: | Percent by weight |
|---|---|
| Water | 82.2 |
| Interpolymer [1] | 0.2 |
| Isopropyl myristate | 0.5 |
| Allantoin | 0.1 |
| Preservative (phenyl mercuric acetate) | 0.1 |
| Part Two: | |
| Cetyl alcohol | 3.0 |
| Oleyl alcohol | 1.0 |
| Emulsifier system [2] | 0.75 |
| Liquid lanolin | 0.5 |
| Stearyl-2-lactylic acid | 1.0 |
| Part Three: | |
| Triethanolamine | 0.2 |
| Water | 1.0 |
| Part Four: | |
| Polyvinylmethylether-maleic anhydride copolymer (2% aqueous solution) | 4.0 |
| Part Five: | |
| Ethanol | 5.0 |
| Hexachlorophene | 0.25 |
| Part Six: | |
| Perfume | 0.1 |
| Color | 0.1 |

[1] A copolymer of about 99% by weight of glacial acrylic acid and about 1% of a polyallyl sucrose in which the sucrose molecule contains about 5–6 allyl carbons.
[2] A mixture of (a) a tertiary amine formed by reacting 15 moles of ethylene oxide with one mole of an ammonium salt of coconut oil fatty acids, and (b) Atlas G-1471—a lanolin product comprising the oleate ester of the alcoholysis reaction between lanolin and a polyoxyethylene ether of sorbitol formed by reacting ethylene oxide with an aqueous sorbitol solution, the ratio of (a) to (b) being 2:1.

A slurry is formed by mixing the interpolymer and the isopropyl myristate, and the resultant slurry is added to water while constantly stirring to insure adequate mixing. While the stirring is continued, the allantoin and preservative are added and the mixture heated to 175° F. In a separate vessel, the constituents of Part Two are mixed and heated to a temperature of 175° F. Part Two is added to Part One while constantly stirring the mixture and then Part Three is added. The resulting mixture is cooled to 100° F. at which time Parts Four, Five and Six are added, with stirring, and the mixture allowed to cool to room temperature.

The produce after cooling to room temperature is charged into 6 oz. aerosol containers, 134 grams of product being placed into each container. Each container is then closed and a valve attached thereto, and 2.5 grams of nitrous oxide gas is then forced into each aerosol container. The containers are constantly and vigorously agitated during the addition thereto of the nitrous oxide. The constant agitation during filling of the propellant is important since without this agitation, the nitrous oxide would require long periods of time on the order of two to three months to become solubilized in the composition. However, by virtue of the constant agitation during filling of the propellant, the nitrous oxide gas is immediately solubilized and the product is ready for use. The product had a pH of 6, and a viscosity of 50 seconds as measured on a No. 5 Raymond flowmeter.

EXAMPLE II

Another embodiment of the dermal lotion of the invention has the following formula:

| Part One: | Percent by weight |
|---|---|
| Water | 78.7 |
| Interpolymer [1] | 0.2 |
| Isopropyl Myristate | 0.5 |
| Allantoin | 0.1 |
| Preservative (phenyl mercuric acetate) | 0.1 |
| Part Two: | |
| Cetyl alcohol | 3.0 |
| Oleyl alcohol | 2.0 |
| Emulsifier system [2] | 0.75 |
| Liquid lanolin | 2.0 |
| Stearyl-2-lactylic acid admixed with mono- and di-glycerides of stearic acid | 1.0 |
| Mineral oil | 1.0 |
| Part Three: | |
| Triethanolamine | 0.2 |
| Water | 1.0 |
| Part Four: | |
| Polyvinylmethylether-maleic anhydride copolymer (2% aqueous solution) | 4.0 |
| Part Five: | |
| Ethanol | 5.0 |
| Hexachlorophene | 0.25 |
| Part Six: | |
| Perfume | 0.1 |
| Color | 0.1 |

[1] A copolymer of about 99% by weight of glacial acrylic acid and about 1% of a polyallyl sucrose in which the sucrose molecule contains about 5-6 allyl carbons.
[2] A mixture of (a) a tertiary amine formed by reacting 15 moles of ethylene oxide with one mole of an ammonium salt of coconut oil fatty acids, and (b) Atlas G-1471—a lanolin product comprising the oleate ester of the alcoholysis reaction between lanolin and a polyoxyethylene ether of sorbitol formed by reacting ethylene oxide with an aqueous sorbitol solution, the ratio of (a) to (b) being 2:1.

The components are mixed according to the procedure set forth above, and the final product is more emollient and moist. The lotion has excellent foaming properties and forms small, uniform voids. The foam breaks down, and is absorbed, within 25 seconds, and leaves a pleasant feel on the skin.

Although the present invention has been described with reference to particular embodiments and examples, it will be apparent to those skilled in the art that variations and modifications can be substituted therefor without departing from the principles and true spirit of the invention.

What is claimed is:
1. A pressurized composition adapted to form foam upon release of the pressure thereof, said foam being useful as a dermal lotion, said composition consisting essentially of
   (A) a nitrous oxide propellant, said propellant being dissolved in:
   (B) an oil-in-water emulsion consisting essentially of
      (I) a discontinuous phase comprising:
         (a) at least one fatty alcohol having from 14 to 18 carbon atoms,
         (b) an ethylene oxide condensate of tertiary amine, said condensate having the formula

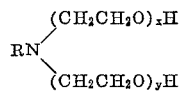

wherein R is a fatty alkyl group having 10–18 carbon atoms and $x$ and $y$ are integers the sum of which averages between about 10 and 40,
         (c) a polyethylene sorbitol lanolin derivative, and
         (d) lanolin; and
      (II) a continuous aqueous phase comprising:
         (a) a copolymer of acrylic acid and a polyether of sucrose in which the hydroxyl groups which are modified are etherified with allyl groups, said polyether containing at least two allyl groups per sucrose molecule, said copolymer being neutralized to a pH of about 4 to 7, and
         (b) water.

2. A composition in accordance with claim 1 which contains isopropyl myristate, mineral oil, and hexachlorophene dissolved in ethanol.

3. A pressurized composition adapted to form foam upon release of the pressure thereof, said foam being useful as a dermal lotion, said composition consisting essentially of:
   (A) a propellant comprising nitrous oxide, said propellant being dissolved in:
   (B) an oil-in-water emulsion comprising:
      (I) a discontinuous phase comprising:
         (a) cetyl alcohol
         (b) oleyl alcohol
         (c) an ethylene oxide condensate of tertiary amine, said condensate having the formula

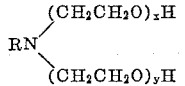

wherein R is a fatty alkyl group having from 10–18 carbon atoms, and $x$ and $y$ are integers the sum of which averages between about 10 and 40
         (d) a polyethylene sorbitol lanolin derivative
         (e) liquid lanolin,
         (f) isopropyl myristate, and
         (g) stearyl-2-lactylic acid; and
      (II) a continuous phase comprising:
         (a) water
         (b) allantoin
         (c) a copolymer of acrylic acid and a polyallyl ether of sucrose in which said ether molecule contains at least two allyl groups, said copolymer being neutralized with
         (d) triethanolamine to provide the desired viscosity.

4. A composition in accordance with claim 3 which contains ethyl alcohol having dissolved therein hexachlorophene.

5. A pressurized composition, adapted to form foam upon release of the pressure, said foam being useful as a dermal lotion comprising nitrous oxide dissolved in an oil-in-water emulsion consisting essentially of:
(I) a continuous aqueous phase comprising:
(a) a copolymer of acrylic acid and a polyallyl ether of sucrose in which the sucrose molecule contains about 5 to 6 allyl groups, said copolymer being neutralized to a pH of about 4 to 7
(b) and water; and
(II) A discontinuous phase comprising:
(a) a mixture of
(1) cetyl alcohol, and
(2) oleyl alcohol, the ratio of cetyl alcohol to oleyl alcohol being from about 1:1 to about 4:1,
(b) isopropyl myristate, and
(c) at least one emulsifying agent of the type that forms an oil-in-water emulsion.

6. A pressurized composition, adapted to form foam upon release of the pressure thereof, said foam being useful as a dermal lotion comprising:
(A) from about 1.75 to about 2.0 parts by weight, of a propellant comprising nitrous oxide, said propellant being dissolved in:
(B) from about 98.0 to about 98.25 parts by weight of an oil-in-water emulsion consisting essentially of:
(I) a continuous aqueous phase comprising:
(a) water
(b) a copolymer of about 99% by weight of glacial acrylic acid and about 1% by weight of a polyallyl ether of sucrose in which the sucrose molecule contains about 5 to 6 allyl groups;
(c) said copolymer being neutralized to a pH of about 4 to 7 with triethanolamine; and
(II) a discontinuous phase comprising:
(a) a mixture of:
(1) cetyl alcohol and
(2) oleyl alcohol, the ratio of cetyl alcohol to oleyl alcohol being from about 1:1 to about 4:1,
(b) at least one emulsifying agent of the type that forms an oil-in-water emulsion,
(c) isoprpyl myristate, and
(d) lanolin.

7. A composition in accordance with claim 6 and also containing an effective amount of hexachlorophene dissolved in ethanol.

8. A pressurized composition, adapted to form foam upon release of the pressure thereof, said foam being useful as a dermal lotion consisting essentially of:
(A) from about 1.75 to about 2.0 parts by weight of a propellant comprising nitrous oxide, said propellant being dissolved in:
(B) from about 98.0 to 98.25 parts by weight of an oil-in-water emulsion comprising:
(I) from about 86 to 92 parts of a continuous phase comprising:
(a) about 0.1 to 0.5 part by weight of a copolymer of about 99% by weight of a glacial acrylic acid and about 1% by weight of a polyallyl ether of sucrose in which the sucrose molecule contains about 5 to 6 allyl groups, said copolymer being neutralized with
(b) sufficient triethanolamine to neutralize said copolymer to a pH of about 4 to 7 to obtain a predetermined viscosity for said composition, and said copolymer being dissolved in
(c) up to about 1.0 part by weight of allantoin
(d) about 0.05 to 0.12 part by weight of a copolymer of a polyvinylmethyl ether with maleic anhydride, and
(e) water; and
(II) from about 2 to 16 parts of a discontinuous phase comprising:
(a) about 2 to 7 parts by weight of a mixture of:
(1) cetyl alcohol and
(2) oleyl alcohol, the ratio of cetyl alcohol to oleyl alcohol being from about 1:1 to about 4:1,
(b) about 0.5 to 3 parts by weight of a mixture of:
(1) an ethylene oxide condensate of cocoamine wherein about 15 moles of ethylene oxide has been reacted with one mole of the cocoamine, and
(2) a polyoxyethylene sorbitol lanolin derivative,
(c) up to about 4 parts by weight of liquid lanolin, and
(d) about 0.25 to 2 parts by weight of a mixture of stearyl-2-lactylic acid and mono- and di-glycerides of stearic acid; and
(III) said oil-in-water emulsion also containing:
(a) about 0.5 to 7 parts by weight of ethanol having
(b) up to about one part by weight of hexachlorophene dissolved therein.

9. The composition of claim 8 wherein said continuous phase contains a preservative selected from the group consisting of methyl parahydroxybenzoate, propyl parahydroxybenzoate, and phenyl mercuric acetate.

10. A pressurized composition, adapted to form foam upon release of the pressure thereof, said foam being useful as a dermal lotion comprising:
(A) from about 1.75 to about 2.0 parts by weight, of a propellant comprising nitrous oxide, said propellant being dissolved in:
(B) from about 98.0 to about 98.25 parts by weight of an oil-in-water emulsion consisting essentially of:
(I) a continuous phase comprising:
(a) about 0.2 part by weight of a copolymer of about 99% by weight of glacial acrylic acid and about 1% by weight of a polyallyl sucrose in which the sucrose molecule contains about 5 to 6 allyl groups, said copolymer being neutralized with
(b) about 0.2 part by weight of triethanolamine to obtain a predetermined viscosity for said composition, and said copolymer being dissolved in
(c) about 0.1 part by weight of allantoin
(d) about 0.1 part by weight of a copolymer of a polyvinylmethyl ether with maleic anhydride
(e) about 0.1 part by weight of phenyl mercuric acetate; and
(f) water; and
(II) a discontinuous phase comprising:
(a) about 4 parts by weight of a mixture of:
(1) cetyl alcohol and
(2) oleyl alcohol, the ratio of cetyl alcohol to oleyl alcohol being about 3:1,
(b) about 0.75 part by weight of a mixture of:
(1) an ethylene oxide condensate of cocoamine wherein about 15 moles of the ethylene oxide condensate has been reacted with one mole of the cocoamine, and
(2) a polyoxyethylene-sorbitol, lanolin and oleic acid interreaction product in the ratio of about 2:1 of said cocoamine to said interreaction product
(c) about 0.5 part by weight of liquid lanolin, and (d) about 1 part by weight of stearyl-2-lactylic acid (III) said oil-in-water emulsion also containing:
 (a) about 5 parts by weight of ethanol, having
 (b) about 0.25 part by weight of hexachlorophene dissolved therein.

11. A pressurized composition, adapted to form foam upon release of the pressure thereof, said foam being useful as a dermal lotion comprising, nitrous oxide dissolved in an oil-in-water emulsion which comprises a discontinuous phase containing lanolin and at least one higher fatty alcohol selected from the group consisting of myristyl alcohol, palmityl alcohol, oleyl alcohol, stearyl alcohol, cetyl alcohol, and mixtures thereof, and an aqueous phase containing a copolymer of an acrylic acid and a polyallyl ether of sucrose in which the sucrose molecule contains about 5 to 6 allyl groups.

12. A method for preparing a pressurized dermal lotion composition adapted to form foam upon release of the pressure thereof, comprising:
 (A) forming a first part by:
  (1) mixing a copolymer of an acrylic acid and a polyallyl ether of sucrose in which the sucrose molecule contains about 5 to 6 allyl groups with isopropyl myristate to form a slurry, and
  (2) adding said slurry to water while continuously stirring,
 (B) forming a second part by admixing:
  (1) a higher fatty alcohol having from 14 to 18 carbon atoms, and
  (2) an oil-in-water emulsifier,
 (C) separately heating said first and second parts to a temperature of about 175° F.,
 (D) adding said second part to said first part while continuously agitating said first part thereby forming an emulsion,
 (E) adjusting the pH of said emulsion to between about 5 and 7,
 (F) charging said emulsion into an aerosol container, and
 (G) adding nitrous oxide propellant to said container.

13. A method for preparing a pressurized composition adapted to form foam upon release of the pressure, said foam being useful as a dermal lotion, comprising:
 (A) forming a first part by:
  (1) mixing about 0.1 to 0.5 part by weight of a copolymer of about 99% by weight of glacial acrylic acid and about 1% by weight of a polyallyl ether of sucrose in which the sucrose molecule contains about 5 to 6 allyl groups with about 0.1 to 5.0 parts by weight of isopropyl myristate,
  (2) adding said slurry to about 80 to 90 parts by weight of water while continuously stirring,
  (3) adding up to about 1.0 part by weight of allantoin to said mixture,
 (B) forming a second part by separately admixing:
  (1) about 2 to 7 parts by weight of a mixture of:
   (a) cetyl alcohol and
   (b) oleyl alcohol, the ratio of cetyl alcohol to oleyl alcohol being from about 1:1 to 4:1,
  (2) about 0.5 to 3 parts by weight of a mixture of:
   (a) an ethylene oxide condensate of cocoamine wherein about 15 moles of ethylene oxide has been reacted with about one mole of the cocoamine, and
   (b) an interreaction product the oleate ester of the reaction product of lanolin and a polyoxyethylene ether of sorbitol,
  (3) up to about 4 parts by weight of liquid lanolin, and
  (4) about 0.25 to 2 parts by weight of a mixture of stearyl-2-lactylic acid and mono- and di-glycerides of stearic acid; and
 (C) heating said first part to a temperature of about 175° F.;
 (D) separately heating said second part to a temperature of about 175° F.;
 (E) adding said second part to said first part while continuously agitating said first part thereby forming an emulsion;
 (F) dissolving triethanolamine in water and adding a sufficient amount of the resulting solution to said emulsion to adjust the pH thereof to between about 5 and 7 while continually agitating said emulsion;
 (G) cooling said emulsion to about 100° F.;
 (H) adding to said emulsion a mixture of about 0.05 to 0.12 part by weight of a copolymer of polyvinylmethyl ether and maleic anhydride with about 0.5 to 7 parts by weight of ethanol having up to about one part by weight of hexachlorophene dissolved therein;
 (I) cooling the resulting composition to room temperature;
 (J) adding about 98 parts of resulting composition to an aerosol container;
 (K) adding about 2 parts by weight of nitrous oxide to said aerosol container while continuously agitating said container; and
 (L) sealing said can.

14. The method of claim 13 wherein about 0.1 part by weight of ap reservative selected from the group consisting of methyl parahydroxybenzoate, propyl parahydroxybenzoate, and phenyl mercuric acetate and said allantoin are added together.

References Cited

UNITED STATES PATENTS 2,675,343  4/1954  Clymer et al.
3,240,396  3/1966  Friedenberg.

ALBERT T. MEYERS, *Primary Examiner.*

D. R. MAHANAND, *Assistant Examiner.*